United States Patent
Kim et al.

(10) Patent No.: US 10,171,022 B2
(45) Date of Patent: Jan. 1, 2019

(54) MOTOR DRIVING DEVICE, AN AIR CONDITIONER INCLUDING SAME AND A CONTROL METHOD THEREFOR

(71) Applicants: Samsung Electronics Co., Ltd., Suwon-si, Gyeonggi-do (KR); RESEARCH BUSINESS FOUNDATION SUNGKYUNKWAN UNIVERSITY, Suwon-si, Gyeonggi-do (KR)

(72) Inventors: Jin-han Kim, Suwon-si (KR); Byoung-kuk Lee, Yongin-si (KR); Min-kook Kim, Suwon-si (KR); Sun-jin Kim, Suwon-si (KR); Hyun-soo Park, Seoul (KR); Dong-gyun Woo, Suwon-si (KR)

(73) Assignees: SAMSUNG ELECTRONICS CO., LTD., Suwon-Si (KR); RESEARCH BUSINESS FOUNDATION SUNGKYUNKWAN UNIVERSITY, Suwon-Si (KR)

( * ) Notice: Subject to any disclaimer, the term of this patent is extended or adjusted under 35 U.S.C. 154(b) by 0 days.

(21) Appl. No.: 15/531,117

(22) PCT Filed: Nov. 19, 2015

(86) PCT No.: PCT/KR2015/012495
§ 371 (c)(1),
(2) Date: May 26, 2017

(87) PCT Pub. No.: WO2016/089032
PCT Pub. Date: Jun. 9, 2016

(65) Prior Publication Data
US 2018/0034403 A1    Feb. 1, 2018

(30) Foreign Application Priority Data
Dec. 1, 2014 (KR) .................. 10-2014-0169832

(51) Int. Cl.
*H02P 23/26* (2016.01)
*H02P 27/06* (2006.01)
(Continued)

(52) U.S. Cl.
CPC ............. *H02P 27/06* (2013.01); *F24F 11/89* (2018.01); *F24F 13/14* (2013.01); *F25B 49/025* (2013.01);
(Continued)

(58) Field of Classification Search
CPC .. H02P 27/06; H02P 2201/07; H02P 2201/15; B60L 15/20; B60L 2210/12;
(Continued)

(56) References Cited

U.S. PATENT DOCUMENTS 8,080,973 B2    12/2011    King et al.
9,242,567 B2    1/2016    Kim et al.
(Continued)

FOREIGN PATENT DOCUMENTS

EP    2 779 406 A2    9/2014
JP    2007-104778    4/2007
(Continued)

OTHER PUBLICATIONS

A Bidirectional High-Power-Quality Grid Interface With a Novel Bidirectional Noninverted Buck—Boost Converter for PHEVs by Omer et al. (IEEE Transactions on Vehicular Technology, vol. 61, No. 5, Jun. 2012, pp. 2018-2030).*
(Continued)

*Primary Examiner* — Muhammad S Islam
(74) *Attorney, Agent, or Firm* — Staas & Halsey LLP

(57) ABSTRACT

A motor driving device is disclosed. The motor driving device includes: a rectifier rectifying alternating current (AC) power into direct current (DC) power to output an input voltage; a first buck-boost converter including a plu-
(Continued)

rality of switches for converting the input voltage and having a buck mode of stepping down the input voltage and a boost mode of stepping up the input voltage; an inverter converting a DC-link voltage transformed from the first buck-boost converter into an AC voltage and transferring the AC voltage to a motor; and a controller receiving motor information related to driving of the motor, comparing magnitudes of a desired DC-link voltage depending on the received motor information and the input voltage with each other, and performing a control to switch only any one of the plurality of switches so that the first buck-boost converter is operated in the buck mode or the boost mode.

15 Claims, 17 Drawing Sheets

(51) Int. Cl.
    *F24F 13/14*         (2006.01)
    *F24F 11/89*         (2018.01)
    *F25B 49/02*         (2006.01)

(52) U.S. Cl.
    CPC .......... *H02P 23/26* (2016.02); *H02P 2201/07* (2013.01); *H02P 2201/15* (2013.01)

(58) Field of Classification Search
    CPC ............... B60L 2210/14; F25B 49/025; Y02T 10/7225; Y02T 10/7233
    See application file for complete search history.

(56) References Cited

U.S. PATENT DOCUMENTS

| | | | |
|---|---|---|---|
| 2009/0027925 A1 | 1/2009 | Kanouda et al. | |
| 2011/0132899 A1 | 6/2011 | Shimomugi et al. | |
| 2011/0170318 A1* | 7/2011 | Chen | B60L 11/123 363/16 |
| 2012/0112702 A1* | 5/2012 | Steigerwald | B60L 3/0069 320/137 |
| 2013/0307489 A1* | 11/2013 | Kusch | B60L 11/1868 320/162 |
| 2014/0042905 A1* | 2/2014 | Lee | H05B 33/0809 315/85 |
| 2014/0271272 A1 | 9/2014 | Jeon et al. | |

FOREIGN PATENT DOCUMENTS

| | | |
|---|---|---|
| JP | 2013-85383 | 5/2013 |
| KR | 10-0351139 | 12/2002 |
| KR | 10-0610729 | 8/2006 |
| KR | 10-2010-0044724 | 4/2010 |
| KR | 10-2010-0084439 | 7/2010 |
| KR | 10-2013-0090678 | 8/2013 |
| KR | 10-2014-0099998 | 8/2014 |
| KR | 10-2014-0112297 | 9/2014 |
| KR | 10-1449513 | 10/2014 |

OTHER PUBLICATIONS

Extended European Search Report dated Nov. 16, 2017, in corresponding European Patent Application No. 15865157.0.
International Written Opinion of the International Searching Authority, PCT/ISA/237, dated Mar. 21, 2016, in corresponding International Patent Application No. PCT/KR2015/012495.
International Search Report, PCT/ISA/210, dated Mar. 21, 2016, in corresponding International Patent Application No. PCT/KR2015/012495.

* cited by examiner

MOTOR DRIVING DEVICE, AN AIR CONDITIONER INCLUDING SAME AND A CONTROL METHOD THEREFOR

CROSS-REFERENCE TO RELATED APPLICATION

This application is a U.S. National Stage Application which claims the benefit under 35 U.S.C. § 371 of PCT International Patent Application No. PCT/KR2015/012495, filed Nov. 19, 2015, which claims the foreign priority benefit under 35 U.S.C. § 119 of Korean Patent Application No. 10-2014-0169832, filed Dec. 1, 2014, the contents of which are incorporated herein by reference.

TECHNICAL FIELD

Apparatuses and methods consistent with the present disclosure relate to a motor driving device, an air conditioner including the same, and a control method therefor, and more particularly, to a motor driving device of which a conversion efficiency is improved in a wide load region by changing a power conversion mode depending on a load, an air conditioner including the same, and a control method therefor.

BACKGROUND ART

An electric motor (hereinafter, referred to as only a motor) has been widely used as a means generating power of electric/electronic devices in various industrial fields, and efforts to implement environmentally friendly products and reduce power consumption as indices of competitiveness of each manufacturer have been made.

In the related art, a motor driving device for driving the motor has used a boost converter.

The motor driving device using the boost converter according to the related art described above constantly controls a direct current (DC)-link voltage output by the boost converter in an entire load region, and thus, a system design and control are simple. However, a large torque ripple and speed ripple appear in a low speed section, and back electromotive force (EMF) of the motor is large in a high speed section, such that a control of a predetermined speed or more is impossible when a weak-field control is not applied.

Another motor driving device for driving the motor according to the related art has used a series-type buck-boost converter.

The motor driving device using the buck-boost converter may control a switching operation of a switch included in the buck-boost converter depending on a rotation speed of the motor to vary a DC-link voltage, and control the varied DC-link voltage and a switching pattern of an inverter to control the rotation speed of the motor. The buck-boost converter capable of stepping up and stepping down a voltage may be applied to a DC-link voltage variable inverter system requiring a wide load range. That is, in a section in which the motor is driven at a low speed, the motor driving device using the buck-boost converter may step down the DC-link voltage to improve driving performance of the motor, and in a section in which the motor rotates at a high speed, the motor driving device using the buck-boost converter may step up the DC-link voltage to a voltage higher than back electromotive force of the motor to control the motor without using an additional weak-field operation algorithm in a weak-field region.

Meanwhile, the motor driving device using the buck-boost converter according to the related art has used a boost control and a buck-boost synchronization control as two control manners of converting an input voltage by the buck-boost converter. The boost control and the buck-boost synchronization control, which are the two control manners, are determined as follows. The buck-boost synchronization control is used in the case of intending to vary the DC-link voltage in a range equal to or smaller than a maximum boundary of an input voltage input to the buck-boost converter, and the boost control is used in the case of intending to vary the DC-link voltage in a range equal to or larger than the maximum boundary of the input voltage.

In more detail, in the boost control, a boost control of stepping up the input voltage by maintaining a switch stepping up the input voltage in a switch-on state and switching another switch is performed. In addition, the input voltage is stepped down depending on a duty ratio using a pulse width modulation (PWM) control signal simultaneously switching two switches.

When the DC-link voltage input to the inverter is stepped down in a low load region in which the motor is driven at a low speed, the respective switching voltages of switches included in the inverter are stepped down, such that switching loss is reduced, and thus, an inverting efficiency of the inverter itself is increased, but in the case of the buck-boost synchronization control manner, the two switches are simultaneously switched on/off, such that switching loss is increased. In addition, since an input current is always discontinuous, a power factor and total harmonic distortion (THD) performance are low. As a result, in a light load region in which the input voltage is stepped down through the buck-boost converter, an efficiency of the inverter and the motor may be increased, but a system efficiency of the entire motor driving device is not improved.

DISCLOSURE

Technical Problem

The present disclosure provides a motor driving device of which a power conversion efficiency is improved in a wide load region by changing a power conversion mode depending on a load, an air conditioner including the same, and a control method therefor.

Technical Solution

According to an aspect of the present disclosure, a motor driving device includes: a rectifier rectifying alternating current (AC) power into direct current (DC) power to output an input voltage; a first buck-boost converter including a plurality of switches for converting the input voltage and having a buck mode of stepping down the input voltage and a boost mode of stepping up the input voltage; an inverter converting a DC-link voltage transformed from the first buck-boost converter into an AC voltage and transferring the AC voltage to a motor; and a controller receiving motor information related to driving of the motor, comparing magnitudes of a desired DC-link voltage depending on the received motor information and the input voltage with each other, and performing a control to switch only any one of the plurality of switches so that the first buck-boost converter is operated in the buck mode or the boost mode.

The controller may compare magnitudes of an instantaneous value of the input voltage varied depending on a time and the desired DC-link voltage with each other, and may control the first buck-boost converter to be operated in the buck mode when the instantaneous value of the input voltage is larger than the desired DC-link voltage and control the first buck-boost converter to be operated in the boost mode when the instantaneous value of the input voltage is smaller than the desired DC-link voltage.

The controller may perform a control to switch only one of the plurality of switches and switch off the others of the plurality of switches when controlling the first buck-boost converter to be operated in the buck mode.

The motor driving device may further include a second buck-boost converter connected to the first buck-boost converter in parallel.

The controller may control the first and second buck-boost converters to be operated in the boost mode when the desired DC-link voltage depending on the received motor information is equal to or larger than a predetermined first threshold value.

The controller may control any one of the first and second buck-boost converters to be operated in the buck mode or the boost mode and control the other of the first and second buck-boost converters to be operated in an idle mode in which a converting operation is not performed, when the desired DC-link voltage depending on the received motor information is less than a predetermined second threshold value.

The controller may control operations of the first and second buck-boost converters in a hysteresis manner depending on a load value calculated from the received motor information.

The controller may control the first buck-boost converter depending on the received motor information including a driving speed of the motor using a lookup table having a plurality of driving speeds of the motor and DC-link voltage values corresponding to each of the plurality of driving speeds to vary the DC-link voltage.

The first buck-boost converter may include: a first switch stepping down the input voltage; and a second switch stepping up the input voltage, and the controller may perform a control to maintain the second switch in a switch-off state and switch the first switch, when the first buck-boost converter is operated in the buck mode.

The motor information may include at least one of a current amount of an input current input to the first buck-boost converter, an angular velocity at which the motor is driven, a phase of the motor, a current amount generated by rotation of a dynamo connected to the motor.

According to another aspect of the present disclosure, a control method for a motor driving device including a rectifier rectifying AC power into DC power to output an input voltage, a first buck-boost converter including a plurality of switches for converting the input voltage and having a buck mode of stepping down the input voltage and a boost mode of stepping up the input voltage, and an inverter converting a DC-link voltage transformed from the first buck-boost converter into an AC voltage and transferring the AC voltage to a motor includes: receiving motor information related to driving of the motor; and comparing magnitudes of a desired DC-link voltage depending on the received motor information and the input voltage with each other and performing a control to switch only any one of the plurality of switches so that the first buck-boost converter is operated in the buck mode or the boost mode.

In the performing of the control, magnitudes of an instantaneous value of the input voltage varied depending on a time and the desired DC-link voltage may be compared with each other, the first buck-boost converter may be controlled to be operated in the buck mode when the instantaneous value of the input voltage is larger than the desired DC-link voltage, and the first buck-boost converter may be controlled to be operated in the boost mode when the instantaneous value of the input voltage is smaller than the desired DC-link voltage.

In the performing of the control, a control may be performed to switch only one of the plurality of switches and switch off the others of the plurality of switches when the first buck-boost converter is controlled to be operated in the buck mode.

The motor driving device may further include a second buck-boost converter connected to the first buck-boost converter in parallel.

In the performing of the control, the first and second buck-boost converters may be controlled to be operated in the boost mode when the desired DC-link voltage depending on the received motor information is equal to or larger than a predetermined first threshold value.

In the performing of the control, any one of the first and second buck-boost converters may be controlled to be operated in the buck mode or the boost mode and the other of the first and second buck-boost converters may be controlled to be operated in an idle mode in which a converting operation is not performed, when the desired DC-link voltage depending on the received motor information is less than a predetermined second threshold value.

In the performing of the control, operations of the first and second buck-boost converters may be controlled in a hysteresis manner depending on a load value calculated from the received motor information.

The first buck-boost converter may be controlled depending on the received motor information including a driving speed of the motor using a lookup table having a plurality of driving speeds of the motor and DC-link voltage values corresponding to each of the plurality of driving speeds to vary the DC-link voltage.

The first buck-boost converter may include: a first switch stepping down the input voltage; and a second switch stepping up the input voltage, and in the performing of the control, a control may be performed to maintain the second switch in a switch-off state and switch the first switch when the first buck-boost converter is operated in the buck mode.

According to still another aspect of the present disclosure, an air conditioner including a compressor compressing and discharging a sucked refrigerant includes: a rectifier rectifying an AC voltage into a DC voltage; a smoother smoothing the rectified DC voltage; a buck-boost converter having a buck mode of stepping down the smoothed input voltage and a boost mode of stepping up the smoothed input voltage; an inverter converting a DC-link voltage transformed from the buck-boost converter into an AC voltage and transferring the AC voltage to a motor; and a controller varying a driving speed of the motor depending on a temperature difference between an indoor temperature and a desired temperature input by a user, receiving motor information related to driving of the motor, and controlling the buck-boost converter to be operated in any one of the buck mode and the boost mode depending on the received motor information.

BEST MODE

Hereinafter, exemplary embodiments of the present disclosure will be described in more detail with reference to the accompanying drawings.

Figure 1:
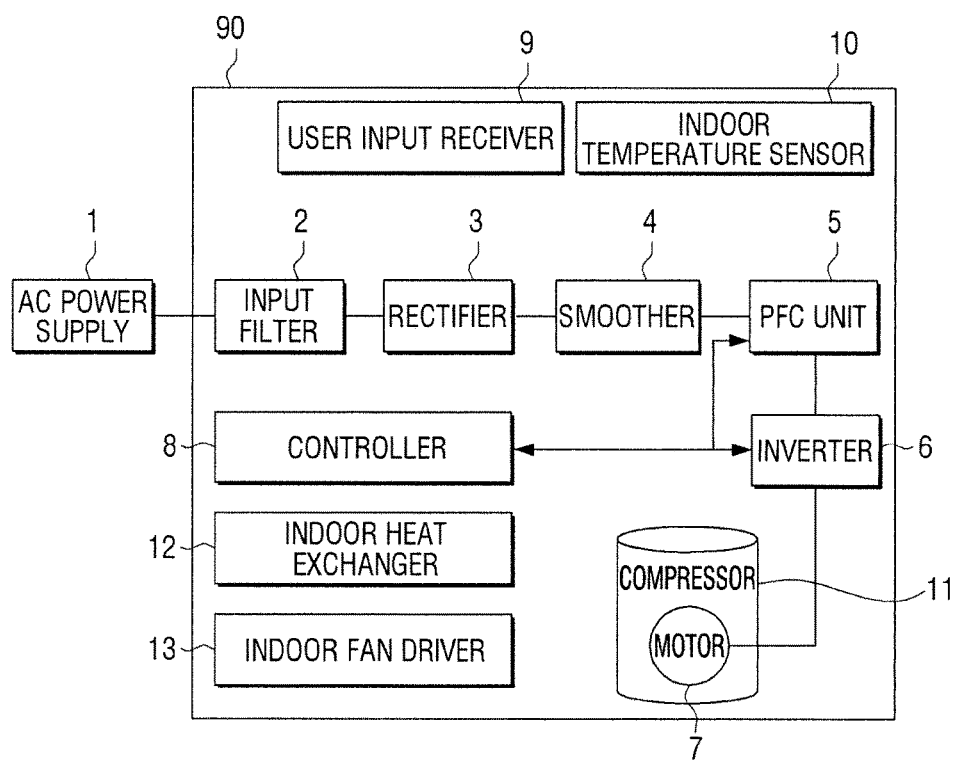
FIG. 1 is a block diagram illustrating a configuration of an air conditioner including a motor driving device according to an exemplary embodiment of the present disclosure.

FIG. 1 is a block diagram illustrating a configuration of an air conditioner including a motor driving device according to an exemplary embodiment of the present disclosure.

Referring to FIG. 1, the air conditioner 90 includes an input filter 2, a rectifier 3, a smoother 4, the motor driving device 50, a compressor 11, an indoor heat exchanger 12, an indoor fan driver 13, a user input receiver 9, and an indoor temperature sensor 10. In addition, the motor driving device 50 includes a power factor correction (PFC) unit 5, an inverter 6, and a controller 8. Further, the compressor 11 includes a motor 7.

The air conditioner 90 receives power input from alternating current (AC) power 1 in an external source. The AC power may be a commercial AC signal supplied to the home.

The input filter 2 removes noise included in the AC power input from the external source or protects an internal circuit. The input filter 2 may be a circuit including an inductor and a capacitor.

The rectifier 3 rectifies the input AC signal into a direct current (DC) signal. The rectifier 3 may be a half-wave or full-wave rectifier circuit, and may include a plurality of switches or diodes.

The smoother 4 smoothes the rectified AC signal. In detail, the smoother 4 may consist of a capacitor, and may delay a change amount in a voltage to a time.

The compressor 11 compresses a refrigerant. In detail, the compressor 11 may compress a high-temperature low-pressure refrigerant corresponding to an indoor temperature into a high-temperature high-pressure refrigerant, and transfer the high-temperature high-pressure refrigerant to the outside depending on a refrigerant cycle of the air conditioner.

The motor 7 included in the compressor 11 converts electric energy into dynamic energy. In detail, the motor 7 may compress the refrigerant input to the compressor using rotation power.

The indoor heat exchanger 12 absorbs indoor heat. In detail, the indoor heat exchanger 12 absorbs the indoor heat, such that a low-temperature refrigerant may be expanded.

The indoor fan driver 13 may allow indoor air to pass through the indoor heat exchanger through an air channel. In detail, the indoor fan driver 13 may drive a fan to form wind, and allow heat of the indoor air to be taken away while the indoor air passes through the indoor heat exchanger 12.

The user input receiver 9 receives a command of a user operating the air conditioner 90. In detail, the user input receiver 9 may be an input for turning on the power, a timer input, and a desired temperature control input. In addition, the user input receiver 9 may include a physical button, or may receive a command signal transmitted from a remote controller using an infrared ray.

The indoor temperature sensor 10 senses an indoor temperature.

The motor driving device 50 performs power conversion for driving the motor. A detailed description will be provided below with reference to FIG. 2.

In the air conditioner according to the exemplary embodiment of the present disclosure as described above, a load amount by which the motor of the compressor is required depending on a difference between the indoor temperature varied depending on an environment and a desired temperature input by a user may be changed depending on a time and a preference of the user, and a case in which the air conditioner is driven for a long period of time to maintain the indoor temperature frequently occurs, and thus, a power conversion efficiency for driving the motor of the compressor in a wide load range may be improved.

Figure 2:
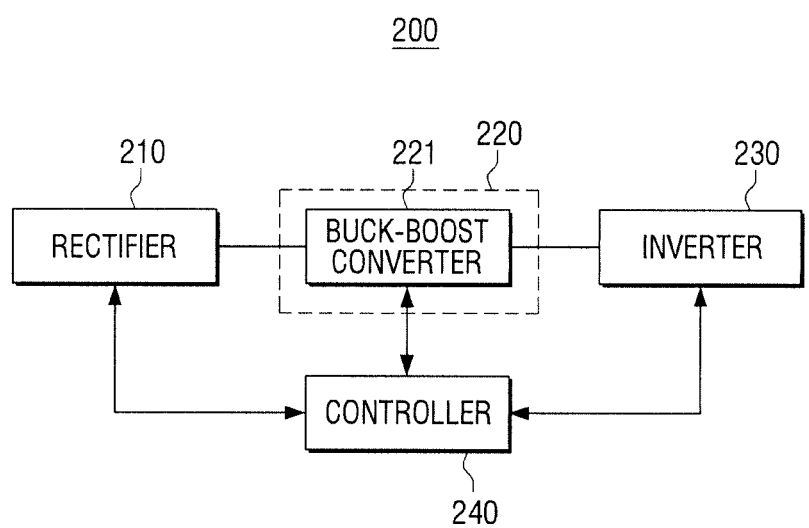
FIG. 2 is a block diagram illustrating a configuration of a motor driving device according to an exemplary embodiment of the present disclosure.

FIG. 2 is a block diagram illustrating a configuration of a motor driving device according to an exemplary embodiment of the present disclosure.

Referring to FIG. 2, the motor driving device 200 according to an exemplary embodiment of the present disclosure includes a rectifier 210, a PFC unit 220, an inverter 230, and a controller 240. In addition, the PFC unit 220 includes a first buck-boost converter 221.

The rectifier 210 rectifies an AC voltage into a DC voltage. In detail, the rectifier 210 may rectify a voltage of an AC signal of which a direction is switched at a predetermined period into a DC voltage in one direction. Here, the rectifier 210 may be a half-wave or full-wave rectifier circuit.

Here, the rectified voltage output from the rectifier 210 may allow a ripple signal varied depending on a time to be smoothed while passing through a smoother (not illustrated).

The PFC unit 220 converts the input DC voltage. In detail, the PFC unit 220 may receive the rectified DC voltage input from the rectifier 210, and convert a magnitude of the input DC voltage through a converting operation. Further, the PFC unit 220 may control the input voltage and an input current from an out-of-phase state to an in-phase state to reduce loss due to reactive power. That is, the PFC unit 220 may improve a power factor of the motor driving device 200 through an active power factor correction control.

The PFC unit 220 may include the first buck-boost converter 221. In detail, the PFC unit 220 may include the first buck-boost converter 221 having a buck mode of stepping down the DC input voltage and a boost mode of stepping up the DC input voltage.

Although a case in which a direct connection-type first buck-boost converter 221 is included in the PFC unit 220 according to an exemplary embodiment of FIG. 2 is described, another topology of voltage converter capable of varying a voltage and improving a power factor by controlling phases of the voltage and a current may be included in the PFC unit 220 at the time of implementing the PFC unit 220.

The first buck-boost converter 221 may include a plurality of switches. In addition, the plurality of switches included in the buck-boost converter 221 may perform switching-on/off operations by control signals of the controller 240.

The inverter 230 may convert a DC-link voltage into an AC voltage. In detail, the inverter 230 may convert the DC-link voltage varied by a switching operation of the first buck-boost converter 221 included in the PFC unit 220 into an AC signal for driving a motor by switching operations of a plurality of switches.

The inverter 230 may receive control signals for switching the plurality of switches included in the inverter 230 from the controller 240 to generate an AC voltage having a desired magnitude and frequency from the received DC voltage.

A general voltage-type inverter circuit or current-type inverter circuit may be used as the inverter 230.

The controller 240 controls the respective components of the motor driving device 200. In detail, the controller 240 may receive motor information related to driving of the motor 7 and control the PFC unit 220 depending on the received motor information. In more detail, the controller 230 may perform a control to vary the DC-link voltage output by the PFC unit 220, to output a desired DC-link voltage depending on the received motor information. In this case, the DC-link voltage may be varied by the control signals of the controller 240 for controlling an operation mode of the first buck-boost converter 221 included in the PFC unit 200.

Here, the desired DC-link voltage indicates a DC-link voltage required for driving the motor. For example, in an air conditioning device, in the case in which rapid cooling is required, a large load acts on the motor, and the desired DC-link voltage indicates a DC-link voltage input to the inverter 230, required as a power source of the motor 7 to be in charge with the large load.

The controller 240 may control the operation mode of the first buck-boost converter 221 depending on a magnitude of the input voltage output from the rectifier 210. In detail, the controller 240 may control the operation mode of the first buck-boost converter 221 so that the PFC unit 220 outputs the DC-link voltage corresponding to the desired DC-link voltage depending on the motor driving voltage. For example, the controller 240 may compare an instantaneous value of the input voltage varied depending on a time with the desired DC-link voltage, and control the first buck-boost converter 221 to be operated in the buck mode when the instantaneous value of the input voltage is larger than the desired DC-link voltage and control the first buck-boost converter 221 to be operated in the boost mode when the instantaneous value of the input voltage is smaller than the desired DC-link voltage.

The controller 240 may generate the control signals for switching on/off the plurality of switches of the first buck-boost converter 221. Here, the controller 240 may control each of a plurality of first buck-boost converters 221 to be operated in any one of the buck mode, the boost mode, and an idle mode. In detail, the controller 240 may generate a pulse width modulation (PWM) signal for switching any one of the plurality of switches included in the first buck-boost converter 221 to step down the input voltage. In addition, the controller 240 may generate a PWM signal for switching any one of the plurality of switches included in the first buck-boost converter 221 to step up the input voltage. In addition, the controller 240 may change duty ratios of the PWM signals for controlling the switches included in the first buck-boost converter 221 depending on a magnitude of a voltage stepped up or stepped down from the input voltage.

In more detail, the controller 240 may perform a control to switch only one of the plurality of switches of the first buck-boost converter 221 and switch off the others of the plurality of switches of the first buck-boost converter 221, to control the first buck-boost converter 221 to be operated in the buck mode.

In addition, the controller 240 may perform a control to switch only another switch, different from the switch switched on at the time of the operation in the buck mode, of the plurality of switches of the first buck-boost converter 221 and switch on the others of the plurality of switches of the buck-boost converter 22, to control the first buck-boost converter 221 to be operated in the boost mode.

The controller 240 may control the first buck-boost converter 221 depending on the received motor information including a driving speed of the motor 7 using a lookup table having a plurality of driving speeds of the motor 7 and DC-link voltage values corresponding to each of the plurality of driving speeds to vary the DC-link voltage. That is, the controller 240 may vary the DC-link voltage using a table in which DC-link voltages at which the motor 7 may be driven at an optimal efficiency are mapped depending on the driving speeds of the motor 7.

Here, the motor information received by the controller 240 may include at least one of a current amount of an input current input to the plurality of first buck-boost converters 221, an angular velocity at which the motor 7 is driven, a phase of the motor, and a current amount generated by rotation of a dynamo connected to the motor 7. For example, a photo-sensor separately provided outside the motor 7 and having a predetermined frequency may sense a rotation speed of the motor and transfer information on the rotation speed of the motor to the controller 240. Other various kinds of information that may be used as elements capable of determining the speed of the motor may be included in the motor information.

In the motor driving device according to the exemplary embodiment of the present disclosure described above, the DC-link voltage of the inverter is varied depending on a load amount to improve an efficiency of the inverter, and operation modes of each of the plurality of buck-boost converters are controlled depending on the load and the input voltage, thereby making it possible to improve an entire efficiency of the motor driving device in an entire load range.

Figure 3:
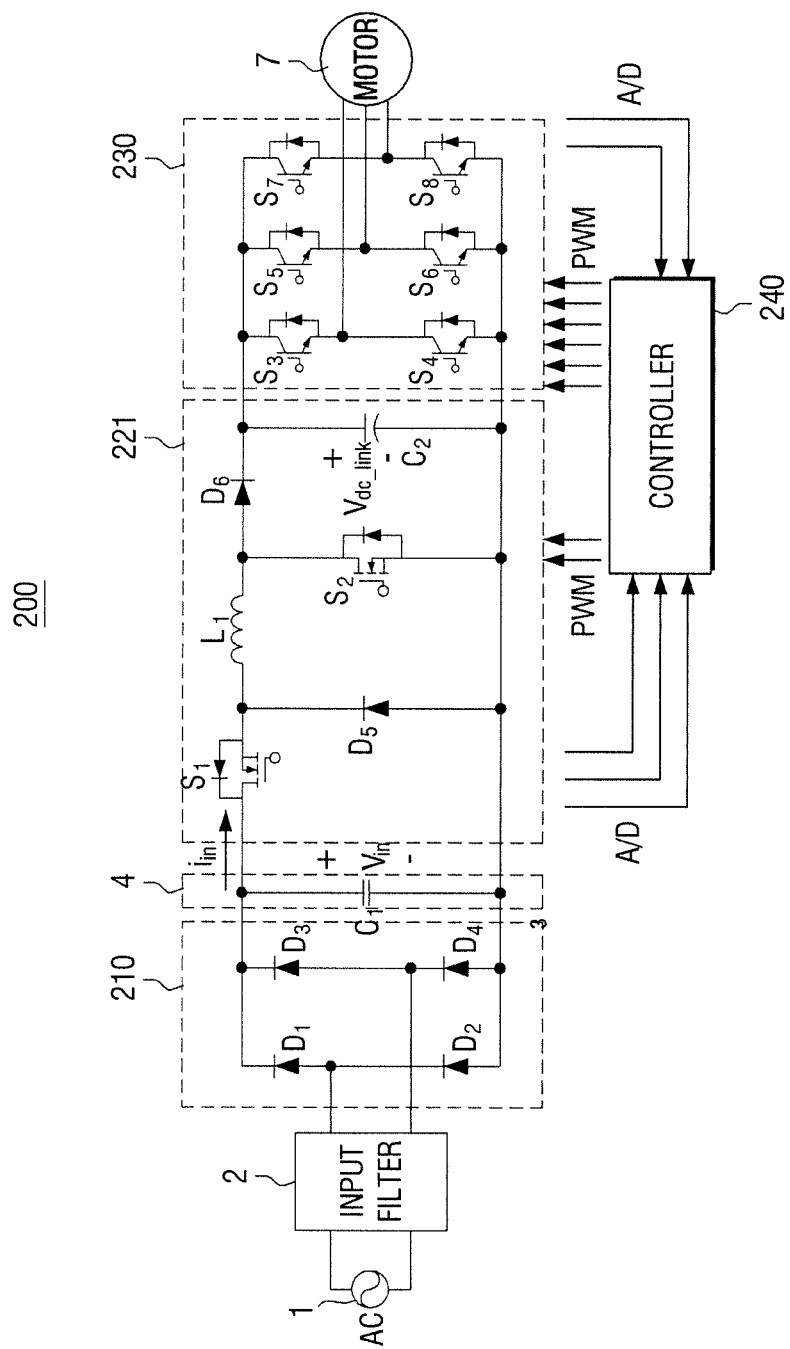
FIG. 3 is a circuit diagram of the motor driving device according to an exemplary embodiment of the present disclosure.

FIG. 3 is a circuit diagram of the motor driving device according to an exemplary embodiment of the present disclosure.

Referring to FIG. 3, a circuit of the motor driving device 200 includes an AC power supply 1, the input filter 2, the rectifier 210, the smoother 4, the buck-boost converter 221, the inverter 230, the motor 7, and the controller 240.

The AC power 1 outputs an AC voltage. In detail, the AC power supply 1 may output commercial AC power of 220 Vrms and 60 Hz.

The AC power supply 1 may input a voltage or a current of an AC signal to the input filter 2, and the input filter 2 may alleviate noise of the input AC signal or strong peak power that may be generated at the time of being connected to the AC power supply 1 to protect elements of the motor driving device 200. In detail, the input filter 2 may be designed to remove the noise and prevent an internal circuit from being damaged by a pulse signal generated when the AC power supply 1 is connected to the input filter 2. The input filter 2 may include inductors connected to each other in series or capacitors connected to each other in parallel.

The rectifier 210 may rectify the AC signal to convert the AC signal into a DC signal. In detail, the rectifier may be a full-wave rectifier circuit including four diodes $D_1$, $D_2$, $D_3$, and $D_4$. Here, the AC signal may be input to nodes each connecting between two pairs of diodes $D_1$ and $D_2$ and $D_3$ and $D_4$ connected to each other in series In addition, two pairs of diodes connected to each other in series may be connected to each other in parallel, and output a rectified signal to both distal ends thereof.

The smoother 4 may smooth the DC signal rectified in one direction, and consist of a first capacitors C1 connected in parallel. Although the smoother 4 according to the present disclosure consists of the first capacitors connected in parallel, the smoother 4 may further include one or plural capacitor and inductor elements connected in series or in parallel.

The buck-boost converter 221 may step up or step down the input DC voltage through switching operations of two switches $S_1$ and $S_2$. In detail, the buck-boost converter 221 may be operated in the buck mode of stepping down the DC voltage in the case in which a first switch $S_1$ is switched and a second switch $S_2$ is switched off, and may be operated in the boost mode of stepping up the DC voltage in the case in which the second switch $S_2$ is switched and the first switch $S_1$ is switched on. The buck-boost converter 221 may output the DC-link voltage stepped up or stepped down from the DC voltage input to a second capacitor $C_2$ connected to an input terminal of the inverter 230 in parallel.

The first buck-boost converter 221 may include the first switch $S_1$, a first inductor $L_1$, and a sixth diode $D_6$ connected, in series, to an input power input to the converter, a fifth diode having an anode connected to a connection node between the first switch and the first inductor, and the second switch connected to a node connecting the first inductor and the sixth diode to each other.

Although a case in which the plurality of switches $S_1$ and $S_2$ included in the buck-boost converter 221 are metal oxide silicon field effect transistor (MOSFET) power semiconductor switches is illustrated, they may be junction field effect transistors (JFETs), insulated gate bipolar mode transistors (IGBTs), and bipolar junction transistors (BJTs).

The inverter 230 may convert the DC-link voltage into the AC voltage, and transfer the AC voltage to the motor 7. In detail, the inverter 230 may be an inverter circuit including six switches $S_3$, $S_4$, $S_5$, $S_6$, $S_7$, and $S_8$ for converting the DC signal into the AC signal.

In detail, the inverter 230 may be a circuit in which three switch stages each having two switches connected to each other in series are connected to a DC-link voltage stage in parallel. In addition, nodes connecting the two switches in each of the switch stages to each other in series may be connected to the motor to transfer a power signal for three-phase driving of the motor to the motor.

The inverter 230 may be a voltage-type inverter circuit performing inverting through the DC-link voltage of the second capacitor $C_2$ connected thereto in parallel or a current-type inverter circuit performing inverting through a DC inductor current input from an inductor connected thereto in series. Although a 6-switch inverter circuit is used as the inverter 230 in an exemplary embodiment of FIG. 3, the inverter 230 may also include four switches.

In FIG. 3, the inverter 230, which is a voltage-type inverter, receives the DC-link voltage input from the second capacitor $C_2$ and inverts the DC-link voltage into the AC signal for driving the motor. However, the inverter 230 may also be a current-type inverter including six inductors and four thyristor switches connected to one another in series.

The controller 240 may receive various kinds of information for controlling the buck-boost converter 221 and the inverter 230, and vary the DC-link voltage and motor driving corresponding to the various kinds of information.

In detail, the controller 240 may receive an input voltage $V_{in}$ and an input current $I_{in}$ input to the buck-boost converter 221 and analog information of the DC-link voltage output by the buck-boost converter 221 as digital information. In addition, the controller 240 may receive analog information indicating a current applied to the motor 7 and a speed of the motor 7 as digital signal information. The information received by the controller 240 as described above may be information sensed from various sensors included outside the motor driving circuit 200.

The controller 240 may generate two PWM signals PWM_S1 and PWM_S2 for controlling the two switches $S_1$ and $S_2$ of the buck-boost converter 221. In addition, the controller 240 may generate six PWM signals PWM_3, PWM_4, PWM_5, PWM_6, PWM_7, and PWM_8 for controlling the six switches $S_3$, $S_4$, $S_5$, $S_6$, $S_7$, and $S_8$ of the inverter.

In detail, the controller 240 may calculate a DC-link voltage value at which the motor may be driven at an optimal efficiency on the basis of the input current, the speed of the motor 7, and the DC-link voltage. In addition, the controller 240 may control duty ratios of the PWM signals for controlling the switches $S_1$ and $S_2$ of the first buck-boost converter 221 or whether or not the switches $S_1$ and $S_2$ are switched on or off, to vary the DC-link voltage to the calculated DC-link voltage. Further, the controller 240 may control duty ratios of the switches $S_3$, $S_4$, $S_5$, $S_6$, $S_7$, and $S_8$ of the inverter 230 to constantly maintain a rotation speed of the motor 7.

Further, the controller 240 may perform a control to switch only any one of the boost switch $S_1$ and the buck switch $S_2$ included in the first buck-boost converter 221, to vary the DC-link voltage to the calculated DC-link voltage.

In the motor driving device according to the exemplary embodiment of the present disclosure as described above, the DC-link voltage of the inverter is varied depending on a load amount to improve an efficiency of the inverter, and the number of switches switched at the time of a step-up or step-down operation of the buck-boost converter is limited, thereby making it possible to improve an efficiency of the motor driving device.

Figure 4:
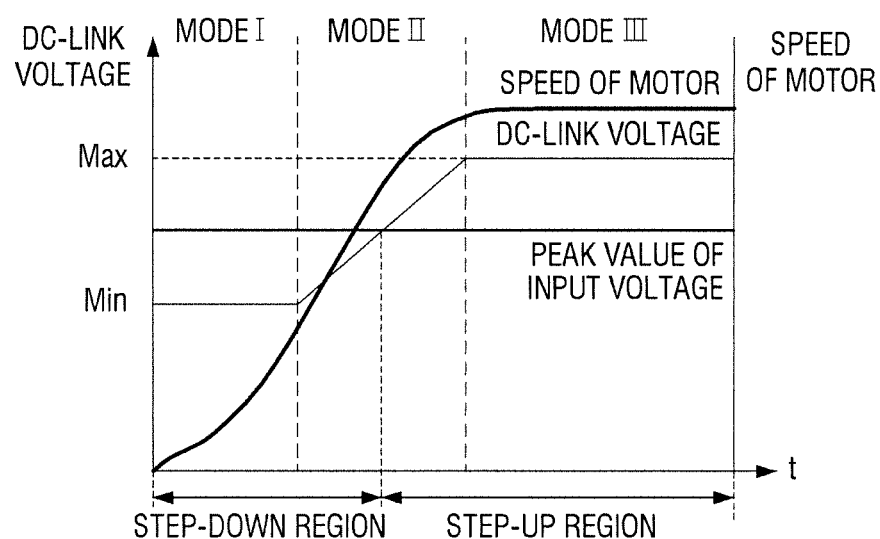
FIG. 4 is a graph for describing a control for varying a direct current (DC)-link voltage of FIG. 3.

FIG. 4 is a graph for describing a control for varying a DC-link voltage.

Referring to FIG. 4, a peak value of an input voltage and a DC-link voltage value at which the inverter may be driven at an optimal efficiency depending on a speed of the motor when a speed of the motor rises up to a maximum speed with respect to time are illustrated.

The DC-link voltage may be varied from a minimum value Min to a maximum value Max. In addition, a time section in which the DC-link voltage is varied depending on the speed of the motor may be divided into a mode I section in which a DC-link voltage Min capable of maintaining the speed of the motor as the lowest speed is maintained, a mode II section in which a DC-link voltage is increased depending on a rise in the speed of the motor, and a mode III section in which a DC-link voltage Max capable of maintaining a maximum speed of the motor is maintained.

Here, when the DC-link voltage and the peak value of the input voltage are compared with each other, the time section may be divided into a step-down region in which the DC-link voltage is smaller than the peak value of the input voltage and a step-up region in which the DC-link voltage is larger than the peak value of the input voltage.

A time in which the buck-boost converter steps down the input voltage and a time in which the buck-boost converter steps up the input voltage may be distinguished from each other by comparing the DC-link voltage depending on the speed of the motor and the peak value of the input voltage with each other as described above.

Figure 5:
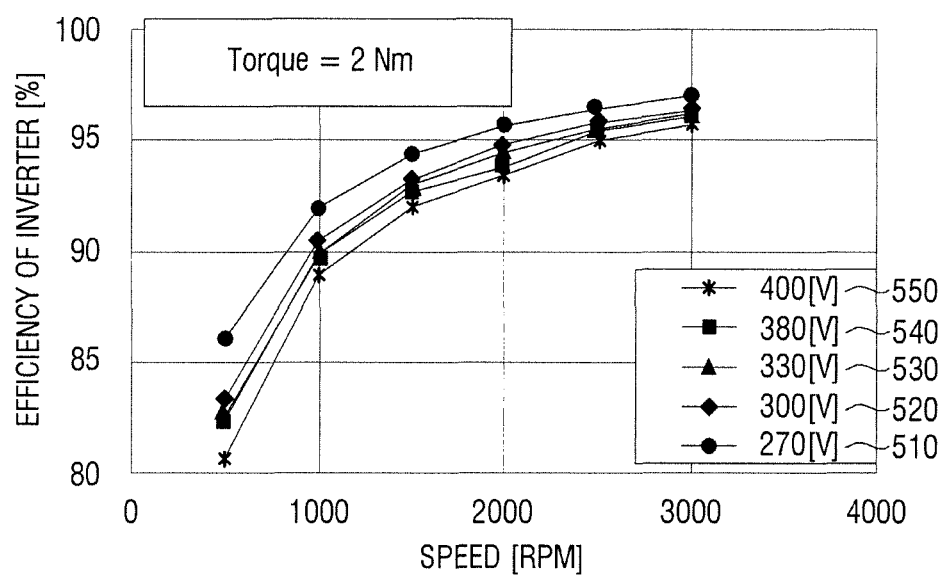
FIGS. 5 and 6 are graphs for describing efficiencies of an inverter.
Figure 6:
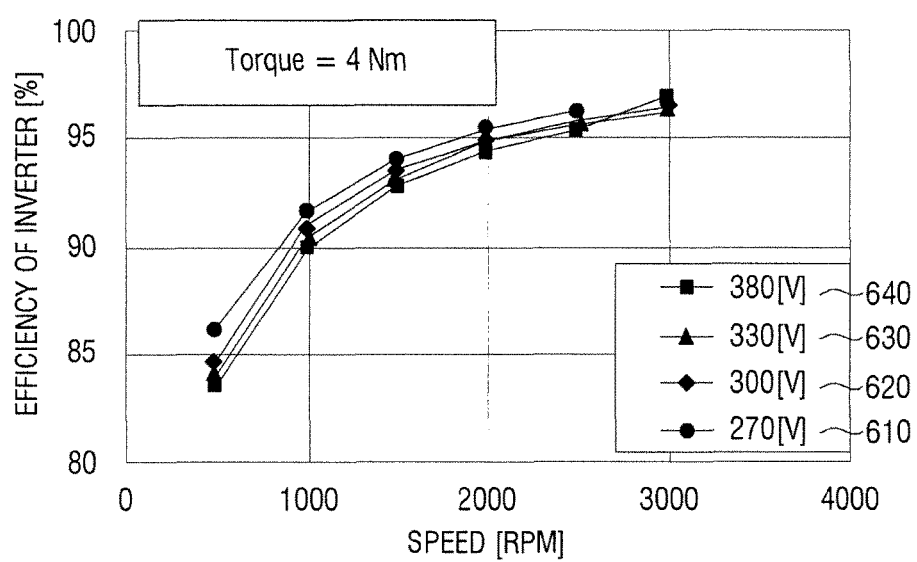

FIGS. 5 and 6 are graphs for describing efficiencies of an inverter.

Referring to FIGS. 5 and 6, efficiencies of the inverter depending on speeds of the motor in different DC-link voltage conditions in the case in which torques of the motor are 2 Nm and 4 Mm are illustrated together.

In detail, the speeds of the motor are represented by a revolution per minute (rpm), and the efficiencies of the inverter are represented by a percentage (%) of output power inverted as an AC signal by the inverter to power input to the inverter.

As illustrated in FIG. 5, it may be confirmed that when the torque of the motor is 2 Nm, in the case in which DC-link voltages of 270V, 300V, 330V, 380V, and 400V are input to the inverter, the lower the voltage of the DC-link voltage, the higher the efficiency of the inverter in an entire speed range of the motor.

In addition, as illustrated in FIG. 6, it may be confirmed that when the torque of the motor is 4 Nm, in the case in which DC-link voltages of 270V, 300V, 330V, and 380V are input to the inverter, the lower the voltage of the DC-link voltage, the higher the efficiency of the inverter in a light load region in which the speed of the motor is low.

The reason of the result as described above is that since currents flowing in a switch of the inverter are the same as each other in load conditions in which the motor is driven at the same speed, as the DC-link voltage becomes low, switching loss becomes low, such that the efficiency of the inverter in the light load region is increased.

Figure 7:
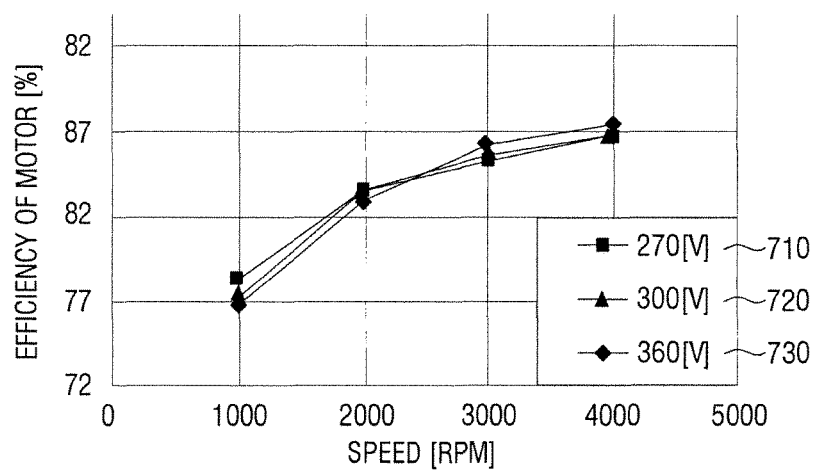
FIG. 7 is graphs for describing efficiencies of a motor.

FIG. 7 is graphs for describing efficiencies of a motor.

Referring to FIG. 7, efficiencies of the motor depending on speeds of the motor in different DC-link voltage conditions are illustrated together.

In detail, the speeds of the motor are represented by a revolution per minute (rpm), and the efficiencies of the motor are represented by a percentage (%) of power output by the motor to power input to the inverter. In addition, 270V, 300V, and 360V are used as magnitudes of the DC-link voltages.

As illustrated in FIG. 7, also in a driving efficiency of the motor, it may be confirmed that since the motor has the same copper loss, but has core loss increased in proportion to the DC-link voltage in the same load condition, the lower the voltage of the DC-link voltage, the higher the efficiency of the motor in the light load region in which the speed of the motor is low.

Figure 8:
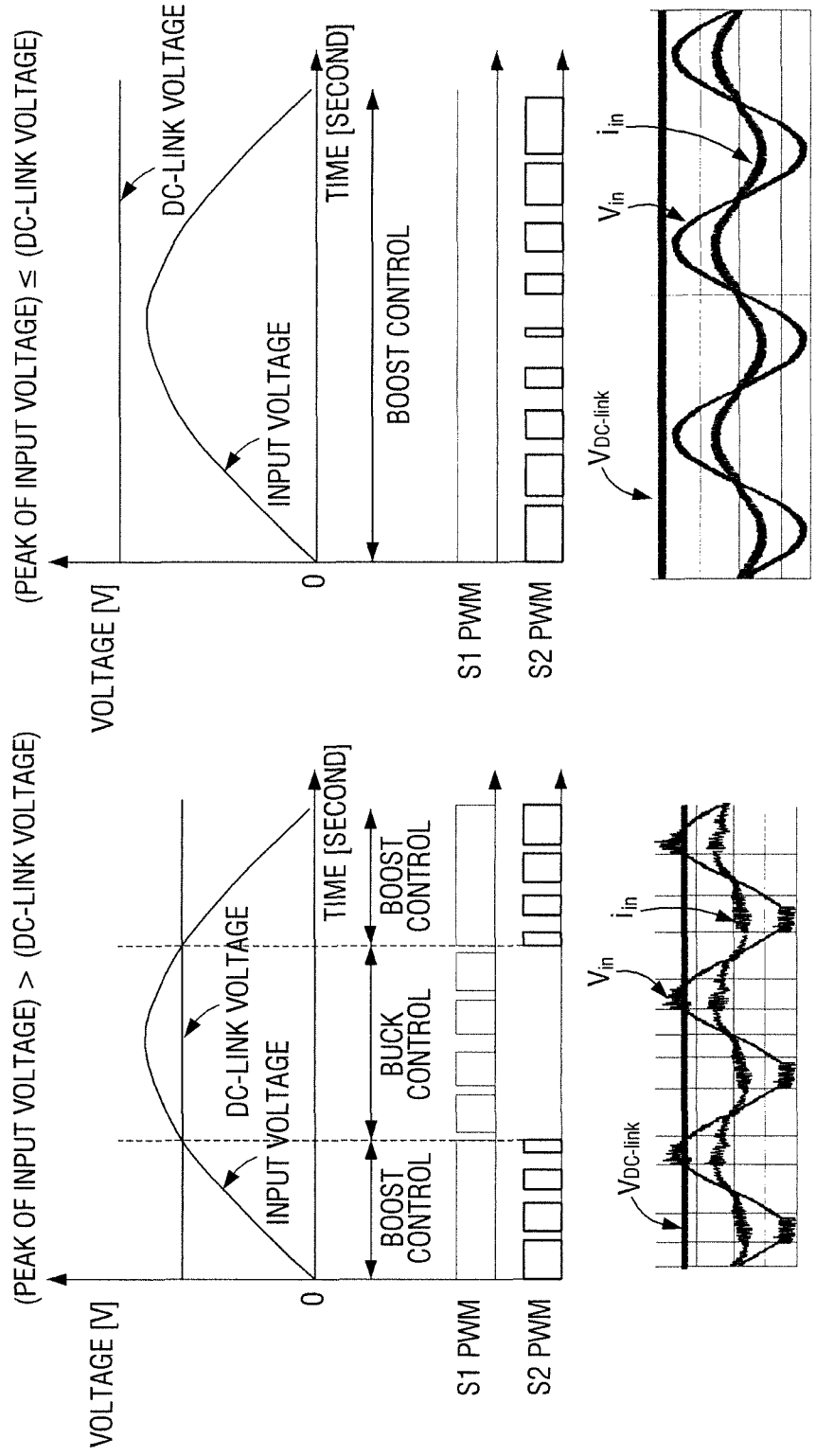
FIG. 8 is graphs illustrating control signals for controlling the motor driving device of FIG. 6 and input/output signals.

FIG. 8 is graphs illustrating control signals for controlling the motor driving device of FIG. 2 and input/output signals.

Referring to FIG. 8, graphs of an input voltage varied in a curved form in which an AC voltage is rectified into a DC voltage, and gently rises and then falls with respect to time and a DC-link voltage are illustrated together, and control signals of the controller changing a control manner to be a boost control and a buck control at a point in time in which two graphs intersect with each other as a comparison result between two voltage values are illustrated as timing graphs below the graphs of the voltages.

In the case in which a peak value of the input voltage is larger than the DC-link voltage, the varied input voltage and the desired DC-link voltage intersect with each other at two points in time for a time of a half cycle.

In a time section in which the input voltage is lower than the DC-link voltage, the controller may generate PWM signals as illustrated in the timing graphs in the switches $S_1$ and $S_2$ so that the buck-boost converter is operated in the boost mode by applying the boost control.

To the contrary, in a time section in which the input voltage is larger than the DC-link voltage, the controller may generate PWM signals as illustrated in the timing graphs in the switches $S_1$ and $S_2$ so that the buck-boost converter is operated in the buck mode by applying the buck control.

In this case, the controller may generate PWM control signals to switch only the switch $S_2$ in a state in which the switch $S_1$ is switched on, at the time of the boost control allowing the buck-boost converter to output a DC-link voltage stepped up from the input voltage, and generate PWM control signals to switch only the switch $S_1$ in a state in which the switch $S_2$ is switched off, at the time of the buck control allowing the buck-boost converter to output a DC-link voltage stepped down from the input voltage.

In the case in which the peak value of the input voltage is smaller than the DC-link voltage, the varied entire input voltage of a half cycle needs to be stepped up, and thus, the controller controls the buck-boost converter to be operated in the boost mode in an entire time section.

Graphs of the DC-link voltage and the input voltage/current through the control manner according to the exemplary embodiment of the present disclosure described above are illustrated at a lower portion, and it may be confirmed that waveforms of the DC-link voltage and the input voltage/current are different from those of a DC-link voltage and an input voltage/current through a buck-boost synchronization control manner according to the related art in which two switches of the buck-boost converter are simultaneously switched. In describing the present disclosure, a manner of comparing magnitudes of the DC-link voltage and the input voltage with each other and applying one of the buck control and the boost control to vary the magnitude of the DC-link voltage is referred to as a buck+boost control to be distinguished from the buck-boost synchronization control manner according to the related art.

In the buck+boost control manner according to the exemplary embodiment of the present disclosure as described above, only some of the plurality of switches included in the buck-boost converter are switched, and thus, switching loss of the converter generated when all the switch of the buck-boost converter are simultaneously switched to step down the input voltage to the DC-link voltage in the light load region in the related art may be reduced.

Figure 9:
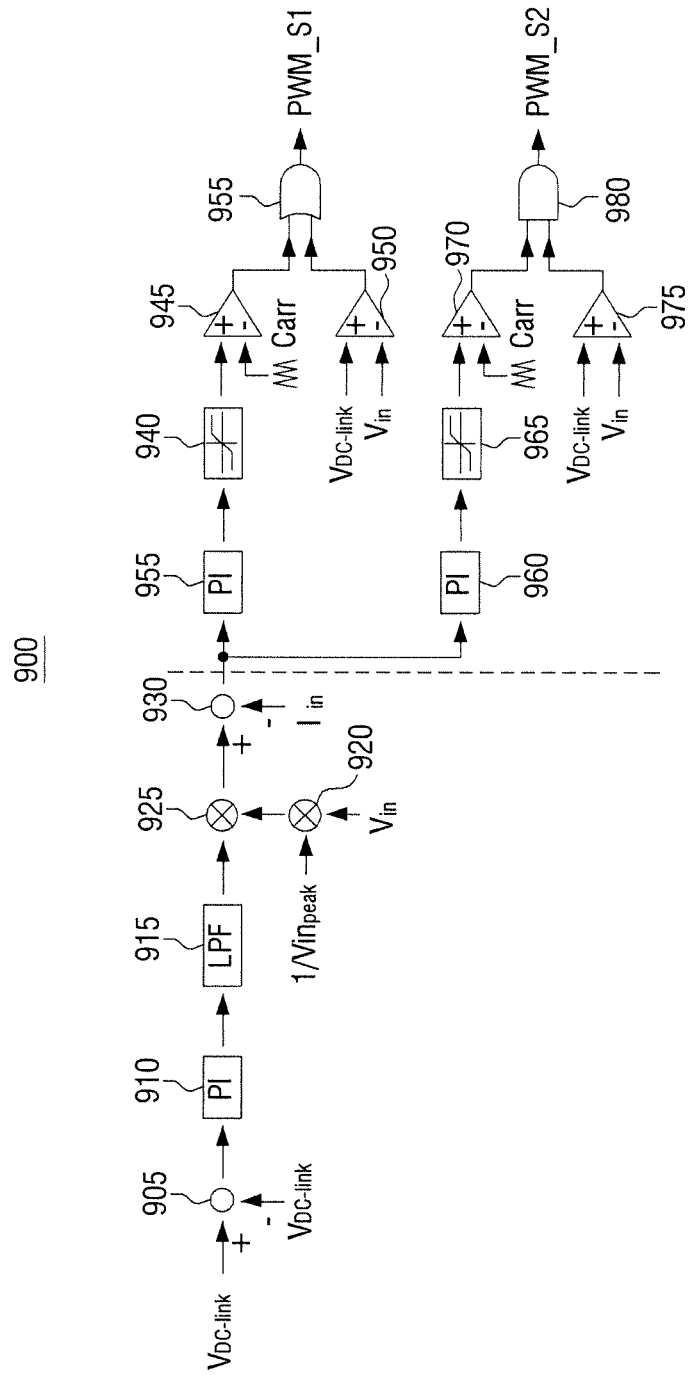
FIG. 9 is a control block diagram of a motor driving device according to an exemplary embodiment of the present disclosure.

FIG. 9 is a control block diagram of a motor driving device according to a first exemplary embodiment of the present disclosure.

Referring to FIG. 9, when the control block diagram is divided into the left and the right on the basis of a dotted line, the left is a block indicating a PFC control for calculating a target DC-link voltage difference to be varied and making an input voltage $V_{in}$ and an input current $I_{in}$ in-phase to increase a power factor. In addition, the right is a control block for determining control signals PWM_S1 and PWM_S2 for controlling two switches $S_1$ and $S_9$ included in a buck-boost converter through a comparison result between an input voltage and a DC-link voltage.

An error between a DC-link voltage that the present control block is to follows and a current DC-link voltage input along a feedback path is calculated on the basis of received motor information (905). An error value passes through a PI control block 910 and a low pass filter 915 and is then multiplied by a ratio of the input voltage to a peak value of the input voltage (925), and an error of the input current is calculated (930).

In an upper end of the right control block, the error of the input current passes through a PI control block 935 to follow a target current and phase, a limiter 940 limits signals in a range of a predetermined higher limit and lower limit to prevent a transient problem that a rapid rise or fall of the signals occurs at the time of a transient response, and a logical OR operation 955 is performed on a result signal having a duty ratio calculated through comparison 945 between magnitudes of an input DC signal and a carrier signal Carr having a triangular wave form and a result obtained through comparison 950 between a DC-link voltage and an input voltage, thereby determining a PWM signal for controlling the first switch.

In a lower end of the right control block, the error of the input current passes through a PI control block 960, and a logical AND operation 980 is performed on a result value obtained through comparison 970 between an input signal and a triangular wave carrier signal Carr in a range 965 of a predetermined higher limit and lower limit and a result obtained through comparison 975 between a DC-link voltage and an input voltage, thereby determining a PWM signal for controlling the second switch.

Figure 10:
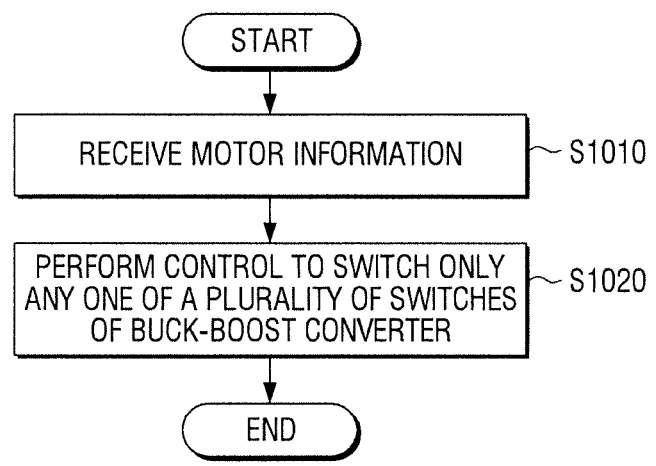
FIG. 10 is a flow chart illustrating a control method for a motor driving device according to an exemplary embodiment of the present disclosure.

FIG. 10 is a flow chart illustrating a control method for a motor driving device according to an exemplary embodiment of the present disclosure.

Referring to FIG. 10, in the control method for a motor driving device, the motor information is first received (S1010). In detail, the received motor information may be information on a driving speed of the motor, a current amount flowing in the motor, and the like. Here, the sensed driving speed of the motor may be used as a parameter determining a load of the motor driving device. In addition, the motor information may be digital information converted from analog information on the sensed driving speed of the motor. In addition, the motor information may include at least one of a current amount of the input current input to the buck-boost converter, an angular velocity at which the motor is driven, a phase of the motor, a current amount generated by rotation of a dynamo connected to the motor.

In addition, a control is performed to switch only any one of the plurality of switches of the buck-boost converter (S1020).

In this case, in the performing (S1020) of the control, when the input voltage input to the buck-boost converter is larger than the desired DC-link voltage corresponding to the received motor information, the buck-boost converter may be controlled to be operated in the buck mode.

In addition, in the performing (S1020) of the control, when the input voltage input to the buck-boost converter is smaller than the DC-link voltage corresponding to the received motor information, the buck-boost converter may be controlled to be operated in the boost mode.

In the control method for a motor driving device according to the exemplary embodiment of the present disclosure described above, the DC-link voltage of the inverter is varied depending on a load amount to improve an efficiency of the inverter, and operation modes of each of the plurality of buck-boost converters are controlled depending on the load and the input voltage, thereby making it possible to improve an entire efficiency of the motor driving device in an entire load range.

The control method for a motor driving device described above may be used in the motor driving device 50 controlling the motor of the compressor in the air conditioner including the compressor compressing and discharging the sucked refrigerant using the motor in FIG. 1. In addition, the method for a motor driving device described above may be used in the motor driving device of FIG. 2.

The control method for a motor driving device according to the exemplary embodiment described above may also be implemented by program codes stored in various types of recording media and executed by a central processing unit (CPU), or the like.

In detail, the program codes for performing the control method for a motor driving device described above may be stored in various types of recording media that is readable by a terminal, such as a random access memory (RAM), a flash memory, a read only memory (ROM), an erasable programmable ROM (EPROM), an electronically erasable programmable ROM (EEPROM), a register, a hard disk, a removable disk, a memory card, a universal serial bus (USB) memory, a compact-disk (CD) ROM, and the like.

Figure 11:
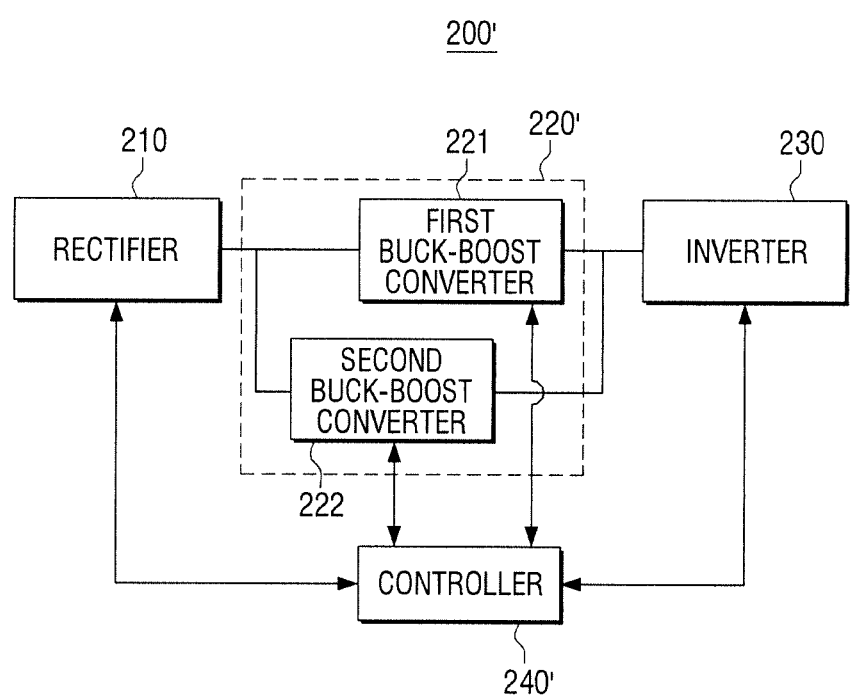
FIG. 11 is a block diagram illustrating a configuration of a motor driving device according to another exemplary embodiment of the present disclosure.

FIG. 11 is a block diagram illustrating a configuration of a motor driving device according to another exemplary embodiment of the present disclosure.

Referring to FIG. 11, the motor driving device 200' includes a rectifier 210, a PFC unit 220', an inverter 230, and a controller 240'. Here, operations and functions of the rectifier 210 and the inverter 230 are the same as those of the rectifier 210 and the inverter 230 of FIG. 2, and thus, a detailed description therefor will be omitted.

The PFC unit 220' converts an input DC voltage. In detail, the PFC unit 220' may receive a rectified DC voltage input from the rectifier 210, and convert a magnitude of the input DC voltage through a converting operation. Further, the PFC unit 220' may control the input voltage and an input current from an out-of-phase state to an in-phase state to reduce loss due to reactive power. That is, the PFC unit 220' may improve a power factor of the motor driving device 200' through an active power factor correction control.

The PFC unit 220' may include a plurality of buck-boost converters 221 and 222. In detail, the PFC unit 220' may include the plurality of buck-boost converters 221 and 222 each having a buck mode of stepping down the DC input voltage, a boost mode of stepping up the DC input voltage, and an idle mode in which a converting operation is not performed.

Although a case in which a first buck-boost converter 221 and a second buck-boost converter 222 are included in the PFC unit 220' according to an exemplary embodiment of FIG. 11 is described, three or more buck-boost converters may be included in the PFC unit 220' at the time of implementation.

Here, the first buck-boost converter 221 and the second buck-boost converter 222 may be connected to each other in parallel. In addition, the respective buck-boost converters 221 and 222 may include a plurality of switches. In addition, the plurality of switches included in the respective buck-boost converters 221 and 222 may perform switching-on/off operations by control signals of the controller 240'.

The controller 240' controls the respective components of the motor driving device 200'. In detail, the controller 240' may receive motor information related to driving of the motor 7 and control the PFC unit 220' depending on the received motor information. In addition, the controller 240' may vary a DC-link voltage depending on the received motor information. In this case, the DC-link voltage may be varied by the control signals of the controller 240' for controlling operation modes of the buck-boost converters 221 and 222 included in the PFC unit 200.

The controller 240' may generate the control signals for switching the plurality of switches of the plurality of buck-boost converters 221 and 222. Here, the controller 240' may control each of the plurality of buck-boost converters 221 and 222 to be operated in any one of the buck mode, the boost mode, and the idle mode. In detail, the controller 240' may generate PWM signals for switching some of the plurality of switches included in the respective buck-boost converters 221 and 222 to step down the input voltage. In addition, the controller 240' may generate PWM signals for switching some of the plurality of switches included in the respective buck-boost converters 221 and 222 to step up the input voltage.

The controller 240' may generate control signals having different phases for each of the plurality of buck-boost converters 221 and 222. Here, the controller 240' may control the plurality of buck-boost converters 221 and 222 in a general interleaved PWM control manner.

The controller 240' may perform a control so that at least one of the plurality of buck-boost converters 221 and 222 is operated in the buck mode when the input voltage is larger than a desired DC-link voltage corresponding to the received motor information. In addition, the controller 240' may perform a control so that at least one of the plurality of buck-boost converters 221 and 222 is operated in the boost mode when the input voltage is smaller than the DC-link voltage corresponding to the received motor information.

In detail, the controller 240' may perform a control so that only one of the plurality of buck-boost converters 221 and 222 is operated in the buck mode or the boost mode and the other of the plurality of buck-boost converters 221 and 222 is operated in the idle mode when the desired DC-link voltage depending on the received motor information is less than a predetermined second threshold value. That is, the controller 240' may perform a control so that only some of the plurality of buck-boost converters 221 and 222 perform a converting operation.

In addition, the controller 240' may control the first and second buck-boost converters 221 and 222 to be operated in the boost mode when the desired DC-link voltage depending on the received motor information is equal to or larger than a predetermined first threshold value.

Here, the controller 240' may control the plurality of buck-boost converters 221 and 222 in a hysteresis manner depending on a load value calculated from the received motor information. In detail, the controller 240' may maintain a buck-boost converter that is already driven with respect to a load value corresponding to a range of a predetermined higher limit and lower limit to prevent an efficiency of a system from being reduced due to a frequent change in the number of driving buck-boost converters. A detailed description for this will be provided below with reference to FIG. 14.

The controller 240' may control the plurality of buck-boost converters 221 and 222 depending on the received motor information including a driving speed of the motor 7 using a lookup table having a plurality of driving speeds of the motor 7 and DC-link voltage values corresponding to each of the plurality of driving speeds to vary the DC-link voltage. That is, the controller 240' may vary the DC-link voltage using a table in which DC-link voltages at which the motor 7 may be driven at an optimal efficiency are mapped depending on the driving speeds of the motor 7.

Here, the motor information received by the controller 240' may include at least one of a current amount of an input current input to the plurality of buck-boost converters 221 and 222, an angular velocity at which the motor 7 is driven, a phase of the motor, and a current amount generated by rotation of a dynamo connected to the motor 7. For example, a photo-sensor separately provided outside the motor 7 and having a predetermined frequency may sense a rotation speed of the motor and transfer information on the rotation speed of the motor to the controller 240'. Other various kinds of information that may be used as elements capable of determining the speed of the motor may be included in the motor information.

In the motor driving device according to the exemplary embodiment of the present disclosure described above, the DC-link voltage of the inverter is varied depending on a load amount to improve an efficiency of the inverter, and operation modes of each of the plurality of buck-boost converters are controlled depending on the load and the input voltage, thereby making it possible to improve an entire efficiency of the motor driving device in an entire load range.

Figure 12:
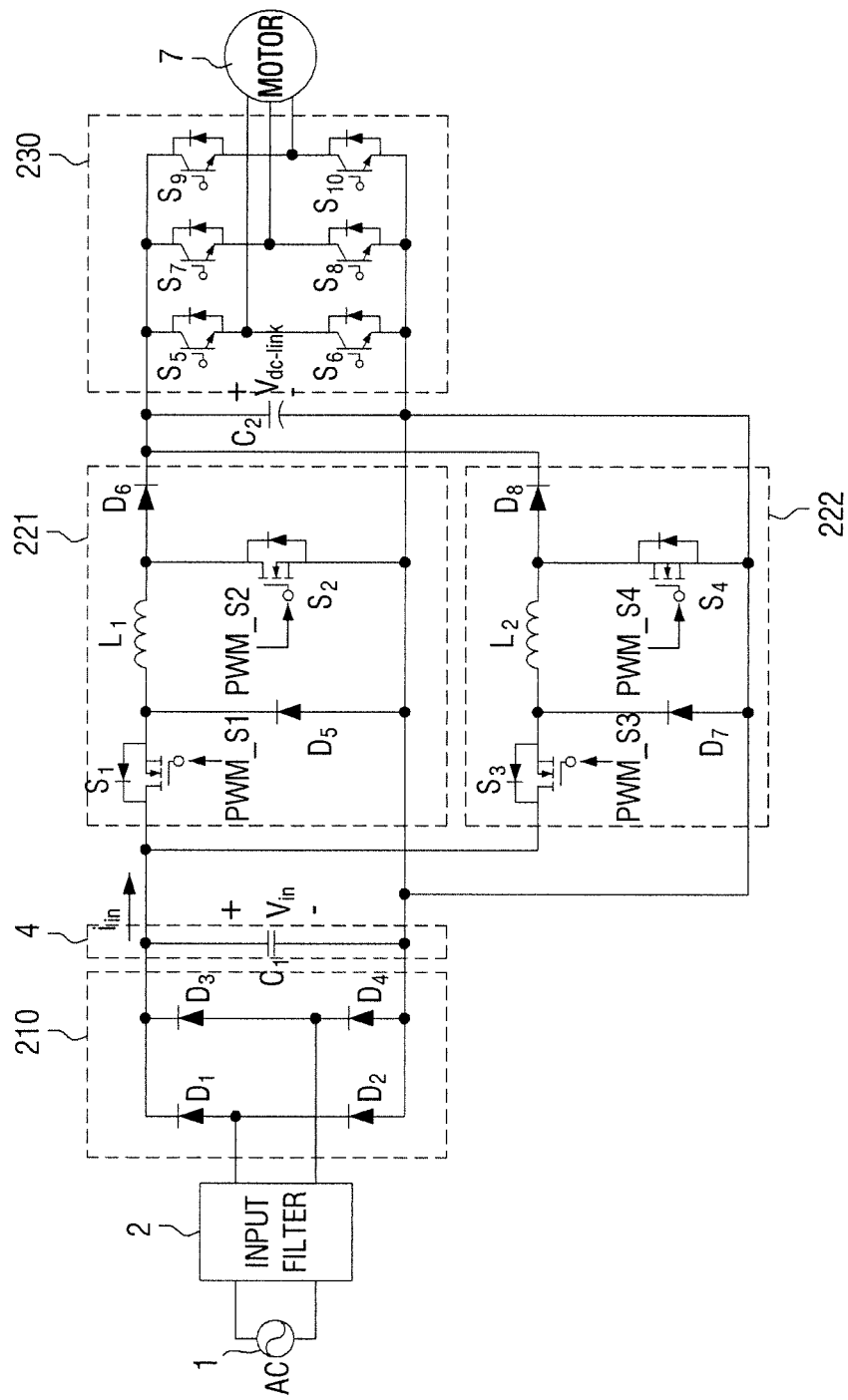
FIG. 12 is a circuit diagram of the motor driving device according to another exemplary embodiment of the present disclosure.

FIG. 12 is a circuit diagram of the motor driving device according to another exemplary embodiment of the present disclosure.

Referring to FIG. 12, a circuit of the motor driving device 200' includes an AC power supply 1, an input filter 2, the rectifier 210, a smoother 4, the first buck-boost converter 221, the second buck-boost converter 222, the inverter 230, and a motor 7. In FIG. 12, illustration of the controller 240 of FIG. 11 is omitted for simplification of explanation. In addition, since the AC power supply 1, the input filter 2, the rectifier 210, the smoother 4, the inverter 230, and the motor 7 are the same as the AC power supply 1, the input filter 2, the rectifier 210, the smoother 4, the inverter 230, and the motor 7, which are the components of the circuit diagram of the motor driving device 200 of FIG. 3, a described detailed functions and operations will be omitted.

The first buck-boost converter 221 may include a first switch $S_1$, a first inductor $L_1$, and a sixth diode $D_6$ connected, in series, to an input power input to the converter, a fifth diode having an anode connected to a connection node between the first switch and the first inductor, and a second switch connected to a node connecting the first inductor and the sixth diode to each other.

The second buck-boost converter 222 has the same circuit configuration as that of the first buck-boost converter 221, and an input terminal thereof receiving power and an output terminal thereof outputting a DC-link voltage may be connected to each other in parallel.

The controller 240' may generate PWM signals PWM_S1, PWM_S2, PWM_S3, and PWM_S4 for controlling a plurality of switches $S_1$, $S_2$, $S_3$, and $S_4$ of the first and second buck-boost converters 221 and 222.

The controller 240' may calculate a desired DC-link voltage value at which the motor may be driven at an optimal efficiency on the basis of the input current $I_{in}$, the speed of the motor 7, and the DC-link voltage. In addition, the controller 240' may control duty ratios of the PWM signals for controlling the switches $S_1$ and $S_2$ of the first buck-boost converter 221 and the switches $S_3$ and $S_4$ of the second buck-boost converter 222 or whether or not the switches $S_1$ to $S_4$ are switched on or off, to vary the DC-link voltage $V_{dc\text{-}link}$ to the desired DC-link voltage. Further, the controller 240' may control duty ratios of the switches $S_3$, $S_4$, $S_5$, $S_6$, $S_7$, and $S_8$ of the inverter 230 to constantly maintain a rotation speed of the motor 7.

The controller 240' may control the plurality of switches $S_1$, $S_2$, $S_3$, and $S_4$ depending on operation modes of the respective buck-boost converters 221 and 222. In detail, the controller 240' may compare magnitudes of the desired DC-link voltage required depending on the motor information and the rectified or smoothed input voltage $V_{in}$ with each other, and determine whether to perform a control so that both of the first and second buck-boost converters 221 and 222 perform converting or perform a control so that only any one of the first and second buck-boost converters 221 and 222 performs converting. In addition, for example, when the desired DC-link voltage depending on the received motor information is equal to or larger than a predetermined first threshold value, the controller 240' may control both of the first and second buck-boost converters 221 and 222 to be operated in the boost mode.

Further, for example, when the desired DC-link voltage depending on the received motor information is less than a predetermined second threshold value, the controller 240' may perform a control so that only the first buck-boost converter 221 of the first and second buck-boost converters 221 and 222 performs a converting operation, and may switch off the switches $S_3$ and $S_4$ so that the second buck-boost converter 222 is operated in the idle mode in which it does not perform a converting operation.

Here, the first buck-boost converter 221 performing the converting may be operated in the buck mode or the boost mode depending on an instantaneous value of the input voltage $V_{in}$ according to a control of the controller 240'.

In the motor driving device according to the exemplary embodiment of the present disclosure described above, the DC-link voltage of the inverter is varied depending on a load amount to improve an efficiency of the inverter, and operation modes of each of the plurality of buck-boost converters are controlled depending on the load and the input voltage, thereby making it possible to improve an entire efficiency of the motor driving device in an entire load range.

In addition, in the motor driving device, output power is distributed to the plurality of buck-boost converters, thereby making it possible to secure stability and robustness of the converter circuit. Further, when the control signals for controlling the plurality of buck-boost converters are interleaved, a ripple component of the converted output voltage may be reduced, and an output frequency higher than a switching frequency may be obtained, such that sizes of input and output filter elements may be reduced.

Figure 13:
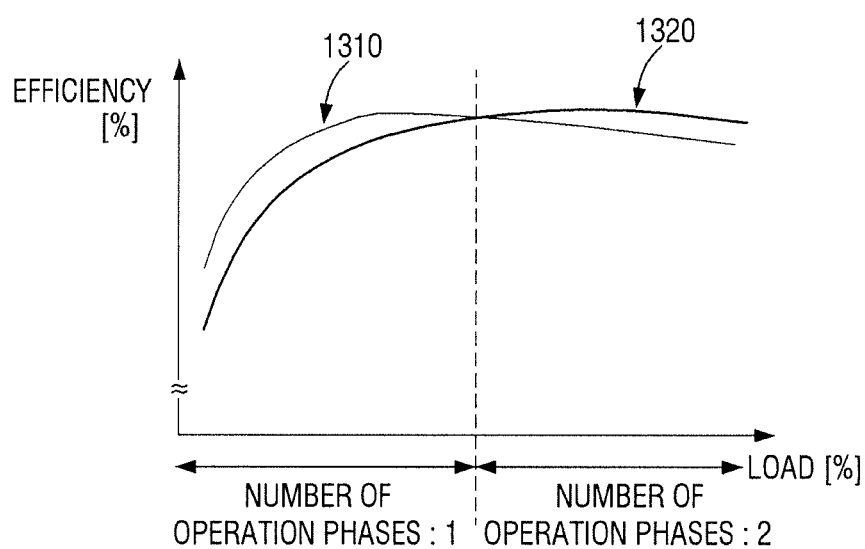
FIG. 13 is graphs for describing the number of phases of a control signal for controlling the motor driving device according to an exemplary embodiment of the present disclosure.

FIG. 13 is graphs for describing the number of phases of a control signal for controlling the motor driving device according to another exemplary embodiment of the present disclosure.

Referring to FIG. 13, an efficiency 1310 of a buck-boost converter depending on a load when only one buck-boost converter is used and an efficiency 1320 of buck-boost converters depending on a load when two buck-boost converters are used are illustrated together.

Referring to the graphs, in a light load region in which a load is low, the efficiency 1320 of converting an input voltage using the two buck-boost converters is lower than the efficiency 1310 of converting an input voltage using one buck-boost converter.

However, in a heavy load region in which a load is high, the efficiency 1320 of converting an input voltage using the two buck-boost converters is higher than the efficiency 1310 of converting an input voltage using one buck-boost converter.

The number of operation phases is determined to be 1 in the light load region on the basis of a load value at a point at which two curves intersect with each other, and the number of operation phases is determined to be 2 in the heavy load region on the basis of the load value at the point at which the two curves intersect with each other. In addition, the number of buck-boost converters that are to perform the converting may be determined depending on the determined number of operation phases, and a control may be performed so that the other buck-boost converter are operated in the idle mode.

The converting operation of the buck-boost converters may be performed at a high power conversion efficiency by the determination of the number of buck-boost converters as described above.

Figure 14:
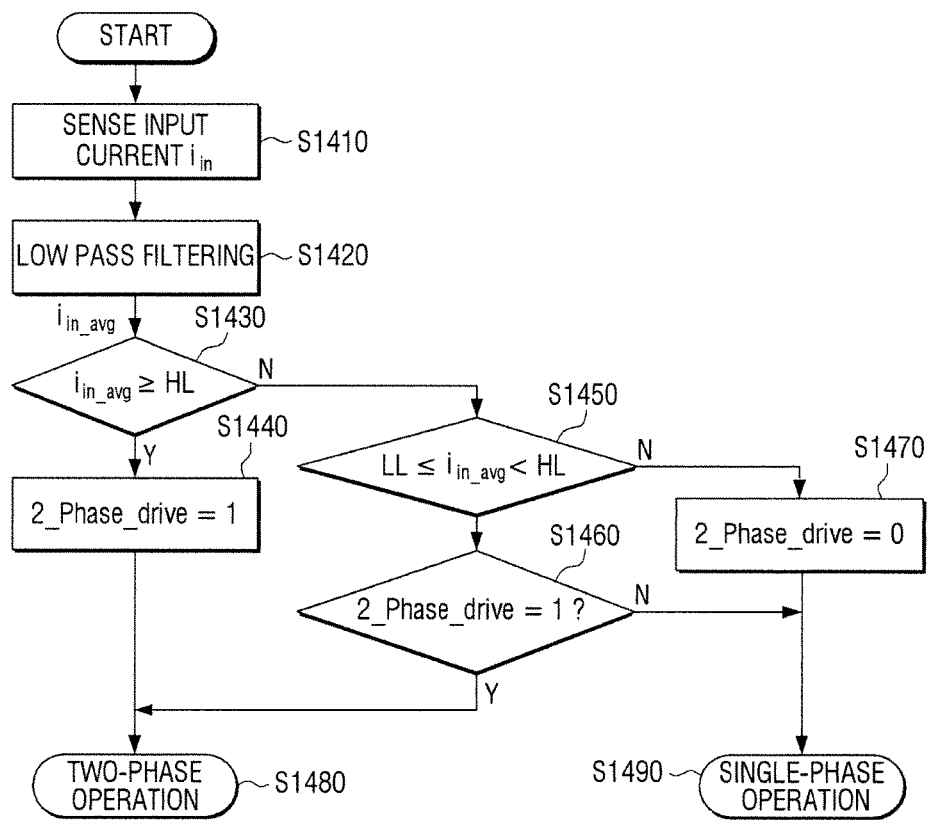
FIG. 14 is a flow chart illustrating a method for determining the number of phases of the control signal for controlling the motor driving device according to an exemplary embodiment of the present disclosure.

FIG. 14 is a flow chart illustrating a method for determining the number of phases of the control signal for controlling the motor driving device according to an exemplary embodiment of the present disclosure.

Referring to FIG. 14, an input current $i_{in}$ that may determine the speed of the motor is sensed as one of the motor information received by the controller (S1410).

The sensed input current $i_{in}$ passes through a low pass filter, such that an average value $i_{in\_avg}$ of the input current over time is calculated (S1420).

The average value $i_{in\_avg}$ of the input current is compared with a predetermined higher limit HL and lower limit LL, such that the number of buck-boost converters that are to perform a converting operation, of two buck-boost converters, may be determined.

In detail, the average value $i_{in\_avg}$ of the input current is compared with the higher limit HL (S1430), and in the case in which the average value $i_{in\_avg}$ of the input current is larger than the higher limit HL (Y), 1 is substituted into a variable 2_Phase_drive validating two-phase driving. In addition, a two-phase operation control is performed so that two buck-boost converters may perform a converting operation (S1480).

In the case in which the average value $i_{in\_avg}$ of the input current is smaller than the higher limit HL (1430: N), the average value $i_{in\_avg}$ of the input current is compared with the lower limit LL (S1450).

In the case in which the average value $i_{in\_avg}$ of the input current is larger than or equal to the lower limit LL and is smaller than the higher limit HL, it is decided whether or not a two-phase operation is performed. Whether or not the two-phase operation is performed may be decided by whether or not the variable 2_Phase_drive is validated to 1 (S1460). In the case in which 2_Phase_drive is 1 (S1460: Y), a control is performed so that the existing two-phase operation is continuously performed (S1480), and in the case in which 2_Phase_drive is not 1 (S1460: Y), a control is performed so that the existing single-phase operation is continuously performed (S1490).

In the case in which the average value $i_{in\_avg}$ of the input current is smaller than the lower limit LL (S1450: N), 0 is substituted into the variable 2_Phase_drive for the purpose of the single-phase operation in which only one buck-boost converter is used, thereby invalidating the variable 2_Phase_drive. In addition, a single-phase operation control is performed so that one buck-boost converter may perform a converting operation (S1490).

The number of operation phases for operating the plurality of buck-boost converters is determined as described above, thereby making it possible to determine the number of buck-boost converters that may perform the converting at an optimal efficiency, and a hysteresis control manner using the average value of the input current is used, thereby making it possible to prevent a reduction in a power conversion efficiency due to a frequent change in the number of buck-boost converters.

Figure 15:
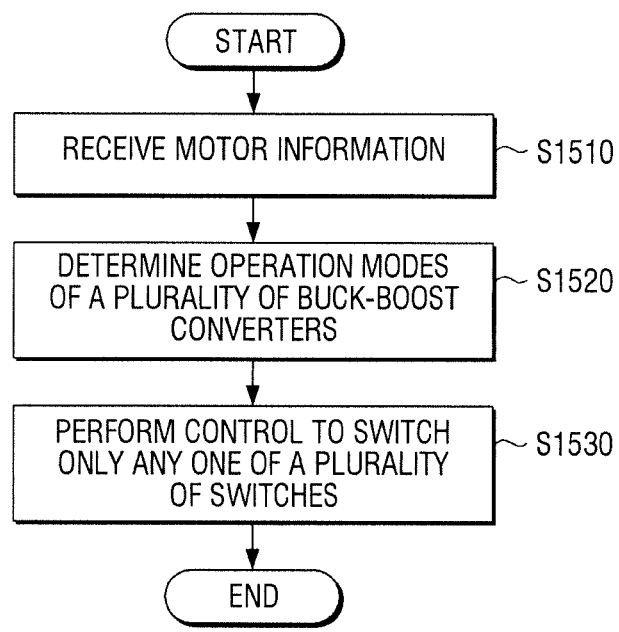
FIG. 15 is a flow chart illustrating a control method for a motor driving device according to another exemplary embodiment of the present disclosure.

FIG. 15 is a flow chart illustrating a control method for a motor driving device according to another exemplary embodiment of the present disclosure.

Referring to FIG. 15, the motor information is first received (S1510). A sensed driving speed of the motor may be received as the motor information to be used as a parameter for determining a load of the motor driving device. In addition, the motor information may be digital information converted from analog information on the sensed driving speed of the motor. Here, the motor information may include at least one of a current amount of the input current input to the plurality of buck-boost converters, an angular velocity at which the motor is driven, a phase of the motor, a current amount generated by rotation of a dynamo connected to the motor.

In addition, the operation modes of the plurality of buck-boost converters are determined (S1520). In detail, each of the plurality of buck-boost converters may be determined to be operated in any one of the buck mode, the boost mode, and the idle mode depending on a magnitude of the desired DC-link voltage depending on the received motor information.

For example, when the input voltage input to the plurality of buck-boost converters is larger than the desired DC-link voltage depending on the received motor information, a control may be performed to operate at least one of the plurality of buck-boost converters in the buck mode.

In addition, when the input voltage input to the plurality of buck-boost converters is smaller than the desired DC-link voltage corresponding to the received motor information, a control may be performed to operate at least one of the plurality of buck-boost converters the boost mode. Here, when a load value calculated from the received motor information is equal to or larger than a predetermined first threshold value, a control may be performed to operate two or more of the plurality of buck-boost converters in the boost mode. That is, the number of buck-boost converters that may provide an optimal efficiency may be determined on the basis of the load amount calculated from the received motor information.

Meanwhile, in the controlling process, when the load amount calculated from the received motor information is less than a predetermined second threshold value, a control may be performed so that only any one of the plurality of buck-boost converters is operated in the buck mode or the boost mode and the other buck-boost converter is operated in the idle mode. Here, the second threshold value may be a value that is the same as or different from the first threshold value.

In addition, in S1520, buck-boost converters that are to perform the converting among the plurality of buck-boost converters may be determined in a hysteresis manner depending on the load value calculated from the received motor information. In detail, in the case in which the load value corresponds to a range between a predetermined higher limit and lower limit, the number of buck-boost converters that are to perform the converting among the plurality of buck-boost converters is not changed, but is maintained, thereby making it possible to prevent additional loss due to a frequent change in the number of buck-boost converters performing the converting operation.

When the operation modes of the plurality of buck-boost converters are determined, a control may be performed to switch only any one of the plurality of switches included in the buck-boost converter performing the converting (S1530).

For example, in the case in which a DC-link voltage equal to or larger than the predetermined first threshold value is required, a control may be performed to switch only one switch for stepping up a voltage in a state in which the plurality of switches are switched on so that all of the plurality of buck-boost converters are operated in the boost mode. In addition, in the case in which the voltage needs to be stepped up, but all of the plurality of buck-boost converters do not need to perform the converting for stepping up the voltage, a control may be performed to switch only any one switch so that only some of the plurality of buck-boost converters are operated in the boost mode. In addition, in the case in which a voltage needs to be stepped down, a control may be performed to switch only any one switch for stepping down the voltage in a state in which the plurality of switches are switched off so that only any one of the plurality of buck-boost converters is operated in the buck mode for stepping down the voltage.

In the control method for a motor driving device according to the exemplary embodiment of the present disclosure described above, the DC-link voltage of the inverter is varied depending on a load amount to improve an efficiency of the inverter, and operation modes of each of the plurality of buck-boost converters are controlled depending on the load and the input voltage, thereby making it possible to improve an entire efficiency of the motor driving device in an entire load range.

The control method for a motor driving device described above may be used in the motor driving device 50 controlling the motor of the compressor in the air conditioner including the compressor compressing and discharging the sucked refrigerant using the motor in FIG. 1. In addition, the method for a motor driving device described above may be used in the motor driving device of FIG. 12.

The control method for a motor driving device according to the exemplary embodiment described above may also be implemented by program codes stored in various types of recording media and executed by a CPU, or the like.

In detail, the program codes for performing the control method for a motor driving device described above may be stored in various types of recording media that is readable by a terminal, such as a RAM, a flash memory, a ROM, an EPROM, an EEPROM, a register, a hard disk, a removable disk, a memory card, a USB memory, a CD ROM, and the like.

Figure 16:
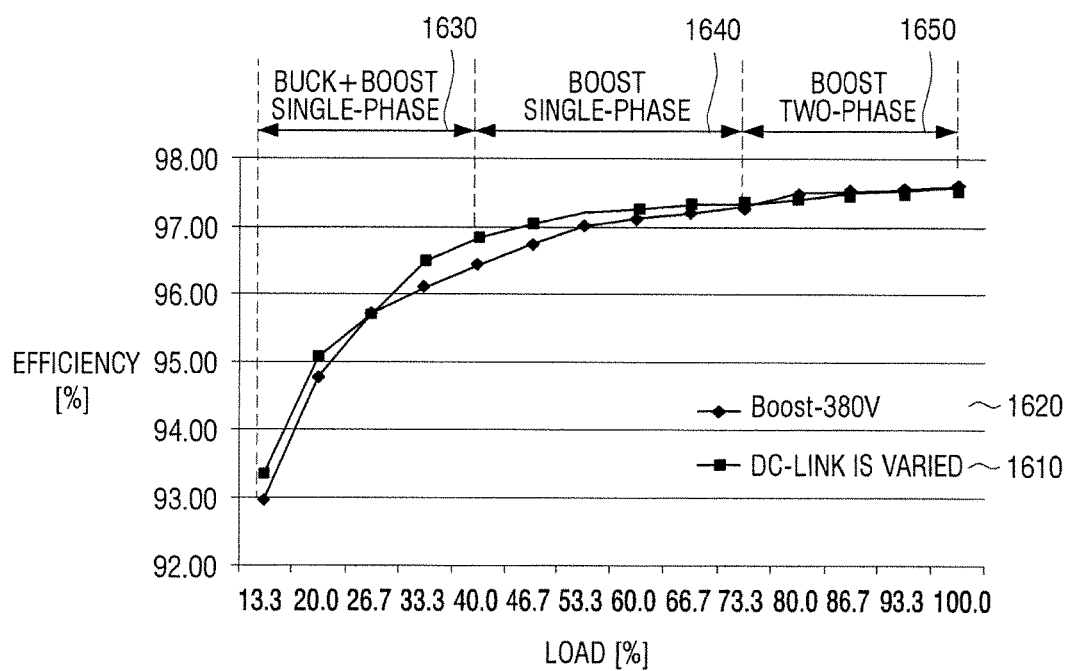
FIG. 16 is graphs for describing the control method for a motor driving device according to an exemplary embodiment of the present disclosure.

FIG. 16 is graphs for describing the control method for a motor driving device according to an exemplary embodiment of the present disclosure.

Referring to FIG. 16, curved graphs of an efficiency 1610 of a converter depending on a load percentage at the time of varying a DC-link voltage and an efficiency 1620 of a converter depending on a load percentage at the time of using a boost control for stepping up a DC-link voltage to 380V are illustrated together.

As illustrated in the graphs of FIG. 16, it may be confirmed that the efficiency of the converter at the time of varying the DC-link voltage is generally higher, and in a light load region, a buck+boost control manner 1630 according to the present disclosure may be applied to further improve the efficiency.

In addition, a single-phase boost control 1640 is performed in a predetermined load or more, and a two-phase boost control 1650 is performed when a load is further increased, such that a step-up range of the DC-link voltage is increased without applying a complicated control manner such as a weak-field control in a heavy load region in which the motor is rotated at a high speed, thereby making it possible to secure a high-speed control region of the motor.

Figure 17:
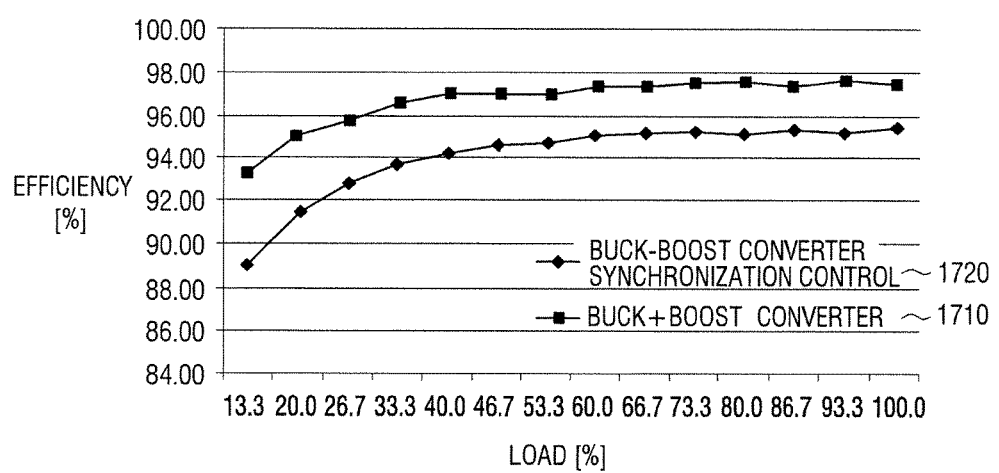
FIG. 17 is graphs for describing an effect of the present disclosure.

FIG. 17 is graphs for describing an effect of the present disclosure.

Referring to FIG. 17, a graph 1720 indicating an efficient depending on a load at the time of applying a buck-boost synchronization control and a graph 1710 indicating an efficient depending on a load at the time of applying a buck+boost control are illustrated together.

As illustrated in FIG. 17, the buck+boost control according to the present disclosure may improve an efficiency higher than that of the existing buck-boost synchronization control manner by 3 to 4%, and may also improve a power factor and total harmonic distortion (THD) performance as compared to the existing buck-boost synchronization control manner.

Although the exemplary embodiments of the present disclosure are illustrated and described hereinabove, the present disclosure is not limited thereto, but may be variously modified and altered by those skilled in the art to which the present disclosure pertains without departing from the spirit and scope of the present disclosure claimed in the claims. These modifications and alterations are to fall within the scope of the present disclosure.

The invention claimed is:

1. A motor driving device comprising:
   a rectifier configured to output an input voltage by rectifying alternating current (AC) power into direct current (DC) power;
   a first buck-boost converter configured to convert the input voltage into a DC-link voltage by stepping down the input voltage in a buck mode or stepping up the input voltage in a boost mode;
   an inverter configured to convert the DC-link voltage for driving a motor into an AC voltage and transfer the AC voltage to the motor; and
   a controller configured to
      receive motor information related to driving of the motor,
      identify a DC-link voltage for driving the motor according to the motor information,
      compare the input voltage with the identified DC-link voltage, to thereby produce a comparison result, and
      based on the comparison result, control the first buck-boost converter to operate one of the buck mode and the boost mode for converting the input voltage into the identified DC-link voltage by switching one of a plurality of switches included in the first buck-boost converter,
   wherein the controller is configured to
      compare an instantaneous value of the input voltage with the identified DC-link voltage,
      in response to the instantaneous value of the input voltage being larger than the identified DC-link voltage, control the first buck-boost converter to operate in the buck mode, and
      in response to the instantaneous value of the input voltage being smaller than the identified DC-link voltage, control the first buck-boost converter to operate in the boost mode.

2. The motor driving device as claimed in claim 1, wherein the controller
   compares magnitudes of an instantaneous value of the input voltage varied according to a time with the identified DC-link voltage,
   controls the first buck-boost converter to be operated in the buck mode when the instantaneous value of the input voltage is larger than the identified DC-link voltage, and
   controls the first buck-boost converter to be operated in the boost mode when the instantaneous value of the input voltage is smaller than the identified DC-link voltage.

3. The motor driving device as claimed in claim 2, wherein the controller performs a control to switch only one of the plurality of switches and switch off the others of the plurality of switches when controlling the first buck-boost converter to be operated in the buck mode.

4. The motor driving device as claimed in claim 1, further comprising a second buck-boost converter connected to the first buck-boost converter in parallel.

5. The motor driving device as claimed in claim 4, wherein the controller controls the first and the second buck-boost converters to be operated in the boost mode when the identified DC-link voltage according to the received motor information is equal to or larger than a predetermined first threshold value.

6. The motor driving device as claimed in claim 4, wherein the controller controls any one of the first and the second buck-boost converters to be operated in the buck mode or the boost mode and controls the other of the first and the second buck-boost converters to be operated in an idle mode in which a converting operation is not performed, when the identified DC-link voltage depending on the received motor information is less than a predetermined second threshold value.

7. The motor driving device as claimed in claim 4, wherein the controller controls operations of the first and the second buck-boost converters in a hysteresis manner according to a load value calculated from the received motor information.

8. The motor driving device as claimed in claim 1, wherein the controller controls the first buck-boost converter according to the received motor information including a driving speed of the motor using a lookup table having a plurality of driving speeds of the motor and DC-link voltage values corresponding to each of the plurality of driving speeds to vary the DC-link voltage.

9. The motor driving device as claimed in claim 1, wherein the first buck-boost converter includes:
a first switch stepping down the input voltage; and
a second switch stepping up the input voltage, and
the controller performs a control to maintain the second switch in a switch-off state and switch the first switch, when the first buck-boost converter is operated in the buck mode.

10. The motor driving device as claimed in claim 1, wherein the motor information includes at least one of a current amount of an input current input to the first buck-boost converter, an angular velocity at which the motor is driven, a phase of the motor, a current amount generated by rotation of a dynamo connected to the motor.

11. A control method for a motor driving device including a rectifier configured to output an input voltage by rectifying AC power into DC power, a first buck-boost converter configured to convert the input voltage into a DC-link voltage by stepping down the input voltage in a buck mode or stepping up the input voltage in a boost mode, and an inverter configured to convert the DC-link voltage for driving a motor into an AC voltage and transfer the AC voltage to the motor, the method comprising:
receiving motor information related to driving of the motor;
identifying a DC-link voltage for driving the motor according to the motor information;
comparing the input voltage with the identified DC-link voltage;
controlling the first buck-boost converter to operate one of the buck mode and the boost mode for converting the input voltage into the identified DC-link voltage by switching one of a plurality of switches included in the first buck-boost converter,
wherein the method further comprises
comparing an instantaneous value of the input voltage with the identified DC-link voltage,
in response to the instantaneous value of the input voltage being larger than the identified DC-link voltage, controlling the first buck-boost converter to operate in the buck mode, and
in response to the instantaneous value of the input voltage being smaller than the identified DC-link voltage, controlling the first buck-boost converter to operate in the boost mode.

12. The control method for a motor driving device as claimed in claim 11, wherein the method comprises:
comparing magnitudes of an instantaneous value of the input voltage varied depending on a time with the identified desired DC-link voltage,
wherein the first buck-boost converter is controlled to be operated in the buck mode when the instantaneous value of the input voltage is larger than the identified DC-link voltage, and
wherein the first buck-boost converter is controlled to be operated in the boost mode when the instantaneous value of the input voltage is smaller than the identified DC-link voltage.

13. The control method for a motor driving device as claimed in claim 12, wherein the method comprises:
switching only one of the plurality of switches and switching off the others of the plurality of switches when the first buck-boost converter is controlled to be operated in the buck mode.

14. The control method for a motor driving device as claimed in claim 11, wherein the first buck-boost converter is controlled according to the received motor information including a driving speed of the motor using a lookup table having a plurality of driving speeds of the motor and DC-link voltage values corresponding to each of the plurality of driving speeds to vary the DC-link voltage.

15. The control method for a motor driving device as claimed in claim 11, wherein the first buck-boost converter includes:
a first switch stepping down the input voltage; and
a second switch stepping up the input voltage, and
wherein the method comprises:
performing control to maintain the second switch in a switch-off state and switch the first switch, when the first buck-boost converter is operated in the buck mode.

* * * * *